US010710888B2

(12) United States Patent
Iyoki et al.

(10) Patent No.: US 10,710,888 B2
(45) Date of Patent: Jul. 14, 2020

(54) BETA ZEOLITE AND METHOD FOR PRODUCING SAME

(71) Applicants: MITSUI MINING & SMELTING CO., LTD., Tokyo (JP); THE UNIVERSITY OF TOKYO, Tokyo (JP)

(72) Inventors: Kenta Iyoki, Tokyo (JP); Keiji Itabashi, Tokyo (JP); Tatsuya Okubo, Tokyo (JP)

(73) Assignees: MITSUI MINING & SMELTING CO., LTD., Tokyo (JP); THE UNIVERSITY OF TOKYO, Tokyo (JP)

( * ) Notice: Subject to any disclaimer, the term of this patent is extended or adjusted under 35 U.S.C. 154(b) by 149 days.

(21) Appl. No.: 15/780,445

(22) PCT Filed: Dec. 4, 2015

(86) PCT No.: PCT/JP2015/084210
§ 371 (c)(1),
(2) Date: May 31, 2018

(87) PCT Pub. No.: WO2017/094196
PCT Pub. Date: Jun. 8, 2017

(65) Prior Publication Data
US 2018/0362356 A1    Dec. 20, 2018

(51) Int. Cl.
*C01B 39/48*    (2006.01)
*C01B 39/06*    (2006.01)
(Continued)

(52) U.S. Cl.
CPC ............. *C01B 39/48* (2013.01); *B01J 29/048* (2013.01); *B01J 29/7007* (2013.01); *B01J 29/86* (2013.01);
(Continued)

(58) Field of Classification Search
CPC ..... C01B 39/48; C01B 37/005; C01B 39/065; C01B 39/12; C01P 2004/61;
(Continued)

(56) References Cited

U.S. PATENT DOCUMENTS 6,117,411 A      9/2000  Takewaki et al.
2015/0086786 A1  3/2015  Itabashi et al.

FOREIGN PATENT DOCUMENTS

JP    2001-019670    1/2001
JP    2002-519281    7/2002
(Continued)

OTHER PUBLICATIONS

Koike et al., "Organic-free synthesis of zincoaluminosilicate zeolites form homogeneous gels prepared by a co-precipatation method", Dalton Trans. 2017, 46, 108387-10846 (Year: 2017).*
Iyoki et al., "Broadening the Applicable Scope of Seed-Directed, Organic Structure-Directing Agent-free synthesis of Zeolite to Zincosilicate Components: A Case of VET-Type Zincosilicate Zeolites", Chem. Mater. 2014, 26, 5, 1957-1966 (Year: 2014).*
Extended European search report issued in the EP Patent Application No. EP15909826.8, dated Oct. 15, 2018.
(Continued)

*Primary Examiner* — David M Brunsman
(74) *Attorney, Agent, or Firm* — Rankin, Hill & Clark LLP

(57) ABSTRACT

The purpose of the present invention is to provide a beta zeolite which includes zinc and has a small particle size. This beta zeolite includes a silicon oxide and a zinc oxide, and has an average particle size of 50 to 100 nm at a cumulative frequency of 50% in a particle size distribution measured by scanning electron microscope observation.

6 Claims, 4 Drawing Sheets

(51) Int. Cl.
- *C01B 39/12* (2006.01)
- *B01J 29/04* (2006.01)
- *B01J 29/70* (2006.01)
- *B01J 29/86* (2006.01)
- *B01J 29/88* (2006.01)
- *C01B 39/08* (2006.01)
- *B01J 29/87* (2006.01)
- *C01B 33/12* (2006.01)
- *C01G 9/02* (2006.01)
- *C01D 15/02* (2006.01)
- *C01F 7/02* (2006.01)

(52) U.S. Cl.
CPC .............. *B01J 29/87* (2013.01); *B01J 29/88* (2013.01); *C01B 33/12* (2013.01); *C01B 39/06* (2013.01); *C01B 39/065* (2013.01); *C01B 39/08* (2013.01); *C01B 39/12* (2013.01); *C01G 9/02* (2013.01); *C01D 15/02* (2013.01); *C01F 7/02* (2013.01); *C01P 2002/72* (2013.01); *C01P 2004/51* (2013.01); *C01P 2004/64* (2013.01)

(58) Field of Classification Search
CPC .... C01P 2004/64; B01J 29/7007; B01J 29/86; B01J 29/88; B01J 29/048; B01J 29/87
See application file for complete search history.

(56) References Cited

FOREIGN PATENT DOCUMENTS

| JP | 2013-234109 | 11/2013 |
|---|---|---|
| WO | 00/00430 | 1/2000 |
| WO | 2013/154086 | 10/2013 |

OTHER PUBLICATIONS

"Synthesis of CIT-6, a zincosilicate with the *BEA topology", Takahiko Takewaki et al., Topics in Catalysis 9 (1999) pp. 35-42, 8 pages, discussed in specification.

"Zincosilicate CIT-6: A Precursor to a Family of *BEA-Type Molecular Sieves", Takahiko Takewaki et al., J. Phys. Chem. B 1999, 103, pp. 2674-2679, 6 pages, discussed in specification.

Mechanism of CIT-6 and VPI-8 Crystallization from Zincosilicate Gels, David P. Serrano et al., Chem. Eur. J. 2002, 8, No. 22, pp. 5153-5160, 8 pages, discussed in specification.

"Dehydrogenation of Propane over Platinum Containing CIT-6", P. Andy and M.E. Davis, Ind. Eng. Chem. Res. 2004, 13, pp. 2922-2928, 7 pages, discussed in specification.

"BEA gata Zincosilicate Zeolite no Koshuritsu Gosei", Kenta Iyoki et al., Nov. 26, 2014, English translation included, 3 pages, listed in International Search Report.

International Search Report, dated Jan. 12, 2016 (dated Jan. 12, 2016), 2 pages.

"Dehydrogenation of Propane over Platinum Containing CIT-6", P. Andy and M.E. Davis, Ind. Eng. Chem. Res. 2004, 43, pp. 2922-2928, 7 pages, discussed in specification.

* cited by examiner

EXAMPLE 1

BETA ZEOLITE AND METHOD FOR PRODUCING SAME

This application is a 371 filing of PCT/JP2015/084210, filed Dec. 4, 2015.

TECHNICAL FIELD

The present invention relates to beta zeolite containing zinc oxide and a method for producing the same.

BACKGROUND ART

As a conventional technique related to beta zeolite containing zinc oxide, namely, zinco silicate beta zeolite, for example, one described in Patent Document 1 is known. This document describes a molecular sieve which contains silicon oxide and zinc oxide, and has a framework topology of zeolite beta, and contains zinc in the crystal framework. This zeolite is named "CIT-6". CIT-6 is produced by a method in which supply sources of silicon oxide, zinc oxide, and aluminum oxide, a supply source of lithium, and a structure directing agent containing tetraethylammonium cation are brought into contact with one another.

In addition, various methods for synthesizing CIT-6 are known (see Non-Patent Documents 1 to 3) other than Patent Document 1. Furthermore, Non-Patent Document 4 describes that CIT-6 is used as a catalyst for dehydrogenation of propane.

Patent Document 1: Japanese Unexamined Patent Application (Translation of PCT Application), Publication No. 2002-519281

Non-Patent Document 1: Topics in Catalysis, 1999, 9, 35-42

Non-Patent Document 2: Journal of Physical Chemistry B, 1999, 103, 2674-2679

Non-Patent Document 3: Chemistry: a European Journal, 2002, 8, 5153-5160

Non-Patent Document 4: Industrial & Engineering Chemistry Research, 2004, 43, 2922-2928

DISCLOSURE OF THE INVENTION

Problems to be Solved by the Invention

CIT-6, which has been hitherto known, has a relatively large particle diameter, this makes it impossible to sufficiently increase the specific surface area, and it cannot be thus said that CIT-6 exhibits sufficient catalytic activity. In addition, according to the synthesis method of CIT-6 known hitherto, the solid yield percentage is at most less than 60%, for example, as described in FIG. 3 of Non-Patent Document 3 and the yield percentage is not sufficient to produce CIT-6 on an industrial scale.

Hence, an object of the present invention is to provide beta zeolite which can solve the drawbacks of the prior art described above and a method for producing the same.

Means for Solving the Problems

The present invention provides beta zeolite which contains silicon oxide and zinc oxide and has an average particle diameter of 50 nm or more and 100 nm or less at a cumulative frequency of 50% in the particle size distribution measured by scanning electron microscope observation.

The present invention also provides a method for producing beta zeolite, which includes (1) a step of mixing a silicon source, a zinc source, an M source, a lithium source, an alkali source, and water so as to obtain a reaction mixture having composition represented by a molar ratio to be presented below;

$SiO_2/ZnO = 2$ or more and 100 or less
$SiO_2/M_2O_3 = 0$ or more and 300 or less
$Li_2O/SiO_2 = 0.01$ or more and 0.2 or less
$TEA_2O/SiO_2 = 0.07$ or more and 0.25 or less
$H_2O/SiO_2 = 3$ or more and 28 or less (in the formula, M represents at least one kind of element selected from the group consisting of aluminum, iron, boron, and gallium. TEA represents a tetraethylammonium ion.)

(2) a step of using beta zeolite as a seed crystal and adding the seed crystal to the reaction mixture at a proportion of 0.1% by mass or more and 30% by mass or less with respect to a silica component in the reaction mixture; and (3) a step of heating the reaction mixture to which the seed crystal has been added at 80° C. or higher and 200° C. or lower in a hermetically sealed manner.

Effects of the Invention

According to the present invention, beta zeolite having a small particle diameter and excellent catalytic activity is provided. According to the present invention, it is also possible to produce such beta zeolite at a high yield percentage and a high yield.

PREFERRED MODE FOR CARRYING OUT THE INVENTION

Figure 1:
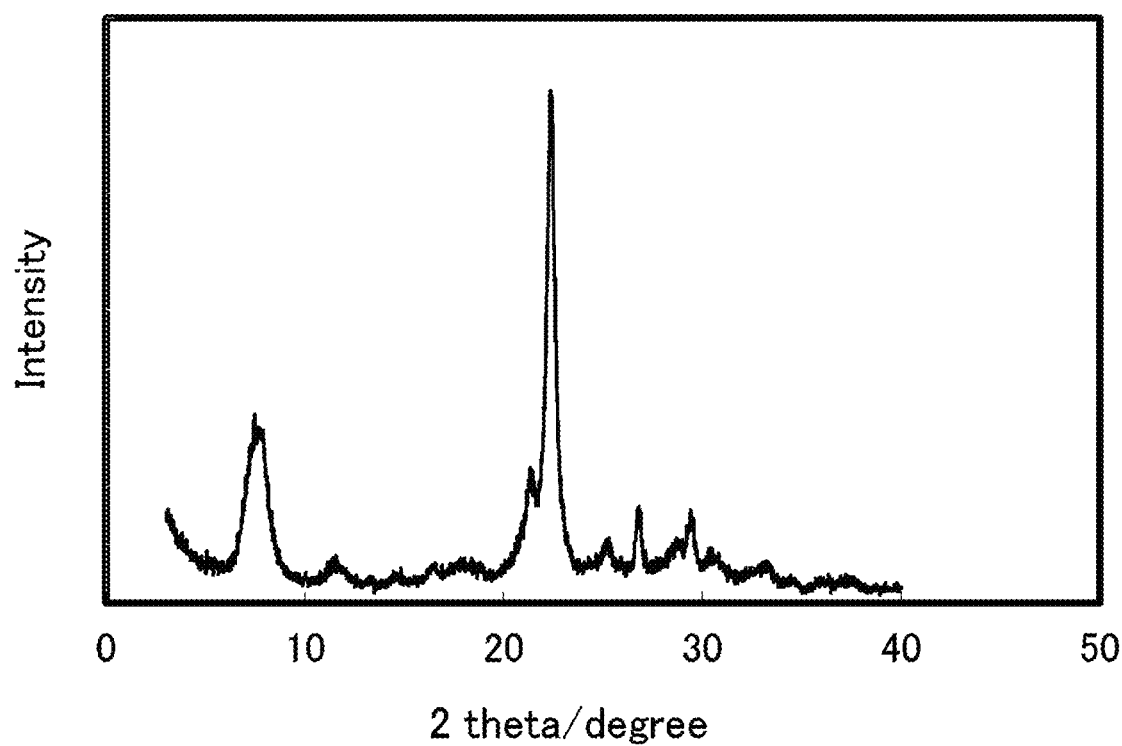
FIG. 1 is an X-ray diffraction pattern of beta zeolite seed crystal used in the respective Examples.

Hereinafter, the present invention will be described based on preferred embodiments thereof. The beta zeolite of the present embodiment contains silicon oxide and zinc oxide. The beta zeolite of the present embodiment has a framework topology represented by BEA and contains zinc in the crystal framework. In other words, the beta zeolite of the present invention is equipped with zinco silicate. In addition, the beta zeolite of the present embodiment may contain at least one kind of trivalent element M selected from the group consisting of aluminum, iron, boron, and gallium as well as contains zinc in the crystal framework. In particular, it is preferable that the beta zeolite of the present embodiment further contains an oxide of aluminum and contains zinc and aluminum in the crystal framework.

The beta zeolite of the present embodiment has one feature that it is a fine particle. Specifically, the beta zeolite is a fine particle having an average particle diameter of 50 nm or more and 100 nm or less at a cumulative frequency of 50% in the particle size distribution measured by scanning electron microscope (hereinafter referred to as "SEM") observation. Such a fine beta zeolite exhibits high catalytic activity by a synergistic effect of the fact that the beta zeolite has a large specific surface area and the fact that the beta zeolite contains zinc in the crystal framework. From this viewpoint, the average particle diameter of the beta zeolite of the present embodiment is preferably 55 nm or more and 95 nm or less and more preferably 60 nm or more and 90 nm or less.

The average particle diameter is determined by observing the beta zeolite of the present embodiment at a magnification of about 100,000 times under SEM, measuring the maximum transverse lengths of 40 or more arbitrarily selected particles, and calculating the arithmetic mean value thereof.

The beta zeolite of the present embodiment is also characterized by particle size distribution in addition to the feature that it is a fine particle. In other words, the beta zeolite is also characterized in that the particle diameters thereof are largely uniform. Specifically, the value of $D_{90}/D_{50}$, which is the ratio of the average particle diameter $D_{90}$ at a cumulative frequency of 90% to the average particle diameter $D_{50}$ at a cumulative frequency of 50% in the particle size distribution measured by SEM observation, is preferably 1.1 or more and 1.8 or less, still more preferably 1.2 or more and 1.7 or less, and yet more preferably 1.2 or more and 1.6 or less. The beta zeolite of the present embodiment exhibits still higher catalytic activity by having such highly uniform particle size distribution.

It is preferable that the appearance shape of particles of the beta zeolite of the present embodiment is a substantially regular polyhedron such as a substantially regular hexahedron or a substantially regular octahedron or a substantially spherical shape formed as the substantially regular polyhedron has rounded corners. Incidentally, in the present embodiment, the term "substantially" of a substantially regular polyhedron includes that a portion such as a vertex of a regular polyhedron is missing and that a portion at which a regular polyhedron is partially deformed may be present.

In the beta zeolite of the present embodiment having the above shape, the molar ratio of $SiO_2/ZnO$ is preferably 15 or more and 80 or less, still more preferably 17 or more and 80 or less, and yet more preferably 18 or more and 70 or less in the as-synthesized state. In addition, in a case in which the beta zeolite of the present embodiment contains the above-described element M in the crystal framework, the molar ratio of $SiO_2/M_2O_3$ is preferably 100 or more and 250 or less, preferably 110 or more and 240 or less, still more preferably 115 or more and 235 or less, and yet more preferably 120 or more and 230 or less.

The volume of micropores of the beta zeolite of the present embodiment is preferably 0.1 cm$^3$/g or more and 0.3 cm$^3$/g or less, still more preferably 0.15 cm$^3$/g or more and 0.3 cm$^3$/g or less, and yet more preferably 0.18 cm$^3$/g or more and 0.3 cm$^3$/g or less. In addition, surface area of micropores is preferably 300 m$^2$/g or more and 600 m$^2$/g or less, still more preferably 300 m$^2$/g or more and 550 m$^2$/g or less, and yet more preferably 330 m$^2$/g or more and 550 m$^2$/g or less.

The BET specific surface area of the beta zeolite of the present embodiment is preferably 400 m$^2$/g or more and 700 m$^2$/g or less and still more preferably 500 m$^2$/g or more and 700 m$^2$/g or less.

The specific surface area and volume described above are measured by using a surface area measuring apparatus by nitrogen adsorption as to be described in Examples later.

The beta zeolite of the present embodiment includes a lithium type, those containing an alkali metal ion other than lithium and a divalent metal ion, and those in which a lithium ion is ion-exchanged with a proton to become a H$^+$ type. The measurement of the various physical properties described above is conducted by regarding the beta zeolite as a proton type. The residual cations after the beta zeolite of the present embodiment is synthesized and then TEA is removed by calcination are mostly protons and only a trace amount of lithium ions remain. In a case in which the residual amount of lithium ions is large and the influence thereof is great, the beta zeolite after calcination is dispersed in an aqueous solution of an ammonium salt such as ammonium nitrate and the lithium ions in the zeolite are substituted with the ammonium ions. H$^+$ type beta zeolite is obtained by calcining this ammonium type beta zeolite again.

Next, a suitable method for producing beta zeolite of the present embodiment will be described. The production method of the present embodiment is roughly divided into the following steps (1) to (3).

(1) A step of preparing a gel of a reaction mixture.
(2) A step of mixing the gel of a reaction mixture with a seed crystal.
(3) A step of heating the reaction mixture to which the seed crystal is added. Hereinafter, the respective steps will be described.

The gel of a reaction mixture to be prepared in the step (1) is obtained by mixing a silicon source, a zinc source, an M source, a lithium source, an alkali source, and water so as to obtain a reaction mixture having the composition represented by the molar ratio to be presented below. The intended beta zeolite can be successfully obtained by setting the composition of the reaction mixture to be within this range. Incidentally, TEA means a tetraethylammonium ion.

(a) $SiO_2/ZnO=2$ or more and 100 or less
(b) $SiO_2/M_2O_3=0$ or more and 300 or less
(c) $Li_2O/SiO_2=0.01$ or more and 0.2 or less
(d) $TEA_2O/SiO_2=0.07$ or more and 0.25 or less
(e) $H_2O/SiO_2=3$ or more and 28 or less A still more preferred range of the composition of the reaction mixture is as follows.

(a') $SiO_2/ZnO=3$ or more and 80 or less
(b') $SiO_2/M_2O_3=0$ or more and 250 or less
(c') $Li_2O/SiO_2=0.02$ or more and 0.16 or less
(d') $TEA_2O/SiO_2=0.1$ or more and 0.23 or less
(e') $H_2O/SiO_2=5$ or more and 25 or less The conditions (d) and (e) are particularly characteristic among the molar ratios of (a) to (e) that are adopted in the present production method when being compared with the synthesis conditions of beta zeolite composed of zinco silicate which have been hitherto known. For example, with regard to the molar ratio of (d), the value of c, which is the molar ratio corresponding to (d), in the composition of a reaction mixture represented by bLi:cTEA:aZnO:SiO$_2$:dH$_2$O is stated as 0.55 or more and 0.7 or less in Patent Document 3 previously described. This numerical range is 0.275 or more and 0.35 or less in terms of the molar ratio represented by (d), and it is understood that a condition higher than the range of the molar ratio of (d) is adopted. In other words, in the present production method, synthesis is conducted under a condition in which the amount of alkali is smaller than that in a conventionally known synthesis condition. The reason for that the synthesis can be conducted under a condition in which the amount of alkali is small is because the synthesis is conducted using a seed crystal of beta zeolite as is clear from the step (2) in the present production method. Moreover, the synthesis can be conducted in a region in which the amount of alkali is small and, as a result, the yield percentage of the intended beta zeolite is improved.

Meanwhile, with regard to the molar ratio of (e), the value of d, which is a molar ratio corresponding to (e), in the composition of a reaction mixture represented by bLi:cTEA:

aZnO:SiO$_2$:dH$_2$O is stated as 30 or more and 40 or less in Patent Document 3 previously described. This numerical range is a range higher than the molar ratio of (e). In other words, in the present production method, the synthesis is conducted under a condition in which the amount of water is smaller than that in a conventionally known synthesis condition. According to the present production method, it is possible to increase the amount of a reaction mixture which can be incorporated into a unit volume as it is possible to conduct the synthesis in a region in which the amount of water is small, and it is thus possible to increase the yield of beta zeolite to be produced per one batch as compared with the prior art.

In this manner, according to the present production method, it is possible to improve both the yield percentage and the yield as compared with those by a conventionally known method for producing beta zeolite composed of zinc silicate. This is significantly advantageous in order to produce beta zeolite on an industrial scale.

Examples of the silicon source to be used for obtaining a reaction mixture having the molar ratio described above may include silica and a silicon-containing compound capable of generating a silicate ion in water. Specific examples thereof may include wet process silica, dry process silica, colloidal silica, sodium silicate, and aluminosilicate gel. These silicon sources can be used singly or in combination of two or more kinds thereof. Among these silicon sources, it is preferable to use silica (silicon dioxide) from the viewpoint of being able to obtain the intended beta zeolite without being accompanied with unnecessary by-products.

As the M source, for example, a water-soluble aluminum-containing compound can be used in a case in which M is aluminum. Specific examples thereof may include sodium aluminate, aluminum nitrate, and aluminum sulfate. In addition, aluminum hydroxide is also a suitable aluminum source. These aluminum sources can be used singly or in combination of two or more kinds thereof. Among these aluminum sources, it is preferable to use sodium aluminate or aluminum hydroxide from the viewpoint of being able to obtain zeolite without being accompanied with unnecessary by-products (for example, a sulfate and a nitrate).

As the M source in a case in which M is iron, for example, iron oxide, iron nitrate, and iron sulfate can be used as the iron source. In a case in which M is boron, for example, boron oxide, sodium borate, and boric acid can be used as the boron source. In a case in which M is gallium, for example, gallium oxide, gallium hydroxide, and gallium nitrate can be used as the gallium source.

As the lithium source, for example, lithium hydroxide, lithium chloride, lithium nitrate, and lithium carbonate can be used. The lithium source is used as a crystallization auxiliary so that a lithium ion acts as a counter ion for a zinc ion and zinc is successfully introduced into the crystal framework during the synthesis of beta zeolite.

As an alkali source, TEAOH (tetraethylammonium hydroxide) is used. In addition, TEAOH functions as an organic SDA when synthesizing beta zeolite as well. Incidentally, lithium hydroxide is also an alkali source in a case in which lithium hydroxide is used as the lithium source described above. In addition, sodium, potassium, and the like may be contained as the alkali source.

As the order of the respective raw materials added when preparing the reaction mixture, a method by which a uniform reaction mixture is easily obtained may be adopted. For example, a uniform reaction mixture can be obtained by dissolving the alkali source and the lithium source in water, adding the zinc source and the silicon source to this solution, and stirring and mixing these together. The temperature at the time of preparing the reaction mixture is also not particularly limited, and generally the preparation may be conducted at room temperature (20° C. to 25° C.)

When the zinc source and the silicon source are added, for example, the zinc source can be added first and the silicon source can be added after the addition of the zinc source is completed. In addition, both of these can also be added in the reverse order. Alternatively, the zinc source and the silicon source can also be added at the same time. Furthermore, as a result of investigations by the present inventors, it has been demonstrated that it is advantageous to subject the zinc source and the silicon source to a mechanochemical treatment prior to the addition of both of these. For example, it is possible to obtain a product of the zinc source and the silicon source in which ZnO and SiO$_2$ are bonded to each other by subjecting both of these to a milling treatment while applying high energy thereto. By conducting such a treatment, remaining and generation of impurities in the intended beta zeolite are suppressed and the yield percentage is further improved. The generation of a compound in which Zn and Si atoms are bonded to each other via an oxygen atom by a mechanochemical treatment can be confirmed, for example, by XRD measurement or UV-VIS measurement of the product. It can be judged that the compound is generated in a case in which a peak attributed to ZnO is not observed or a change in bonding state of Zn is observed by these kinds of measurement. For the mechanochemical treatment, for example, a planetary ball mill, a rolling ball mill, a medium stirring mill, a bead mill, a hammer mill, a shear type mill and the like can be used.

Next, the step (2) will be described. In the present step, the gel of a reaction mixture obtained in the step (1) is mixed with a seed crystal. As the seed crystal, beta zeolite is used. With regard to the beta zeolite to be used as a seed crystal, the kind of element to be contained in the crystal framework is not particularly limited. For example, (i) aluminosilicate of a compound which contains silicon oxide and aluminum oxide but does not contain zinc oxide, (ii) zinco silicate of a compound which contains silicon oxide and zinc oxide but does not contain aluminum oxide, and (iii) zinc-aluminosilicate of a compound which contains silicon oxide, aluminum oxide, and zinc oxide can be used. These seed crystals can be used singly or in combination of two or more kinds thereof.

The seed crystal can be synthesized by a conventionally known method. For example, beta zeolite can be synthesized by a method using an organic SDA in the case of using beta zeolite composed of zinco-aluminosilicate as the seed crystal. In addition, a commercially available product can also be used as the seed crystal. Furthermore, a zinco silicate synthesized by the present production method can also be used as the seed crystal.

The amount of the seed crystal to be added to the reaction mixture is set to be a proportion of preferably 0.1% by mass or more and 30% by mass or less, still more preferably 0.5% by mass or more and 20% by mass or less, and still more preferably from 1% by mass or more and 20% by mass or less with respect to the silica component in the reaction mixture. It is possible to successfully produce beta zeolite having the intended particle diameter by setting the proportion of the seed crystal to the reaction mixture to be in this range.

In the step (2), the gel of a reaction mixture obtained in the step (1) is mixed with the seed crystal and then stirred so that the seed crystal is uniformly dispersed. The temperature for mixing is not particularly limited, and generally room temperature (20° C. to 25° C.) can be adopted. It is preferable that the seed crystal is also a fine particle from the viewpoint of obtaining the intended fine beta zeolite. The average particle diameter of the seed crystal is preferably 5 nm or more and 100 nm or less at a cumulative frequency of 50% in the particle size distribution measured by SEM observation.

It is preferable that the reaction mixture which does not contain the seed crystal is heated, the seed crystal is then added to the reaction mixture heated, and the reaction mixture containing the seed crystal is reheated prior to the step (2) since the crystallization easily proceeds. The temperature and time for heating of the reaction mixture which does not contain the seed crystal are set so that the effect described above is exerted to the maximum. In the present production method, heating is conducted at preferably 80° C. or higher and 200° C. or lower and still more preferably 100° C. or higher and 180° C. or lower for a range of preferably from 2 hours to 1 day.

Next, the step (3) will be described. In the present step, the reaction mixture containing the seed crystal is placed in a hermetically sealed vessel and heated for reaction and the intended beta zeolite is thus crystallized. As one method for conducting crystallization, there is a method in which the reaction mixture is heated by a settling method without being aged. Alternatively, it is also possible to adopt a method in which the reaction mixture is aged and then heated without being stirred. The aging refers to an operation of maintaining the reaction mixture at a temperature lower than the reaction temperature for a certain period of time. The reaction mixture is generally left to stand without being stirred when being aged. It is known that effects that generation of impurities of by-products is prevented, heating can be conducted under stirring without the generation of impurities of by-products, the reaction rate increases, and the like are exerted by conducting aging. However, the mechanism of the action is not necessarily clear. The temperature and time for aging are set so that the effect described above is exerted to the maximum. In the present production method, aging is preferably conducted at 20° C. or higher and 80° C. or lower and still more preferably 20° C. or higher and 60° C. or lower for a range of preferably from 2 hours to 1 day.

In the step (3), it is possible to prevent the generation of impurities of by-products by conducting heating and stirring after aging is conducted in the case of conducting stirring in order to achieve uniformity of temperature of the reaction mixture during heating. The stirring is conducted in order to achieve uniformity of composition and temperature of the reaction mixture, and there are mixing by a stirring blade, mixing by rotation of the vessel, and the like. The stirring strength and the number of revolutions may be adjusted depending on the uniformity of the temperature and the generation status of impurities of by-products. Intermittent stirring may be adopted instead of continuous stirring. It is possible to realize industrial mass production by combining aging and stirring in this manner.

In either case of the settling method or the stirring method, the temperature for heating the reaction mixture to which the seed crystal is added is preferably 80° C. or higher and 200° C. or lower, still more preferably 100° C. or higher and 180° C. or lower, yet more preferably 120° C. or higher and 180° C. or lower. Heating is heating at the autogenous pressure since it is conducted in a hermetically sealed vessel. It is possible to synthesize beta zeolite without being accompanied with an extreme decrease in the crystallization rate by adopting the heating temperature in this range. In addition, it is possible to synthesize beta zeolite while suppressing generation of impurities. The heating time is not critical in the present production method, and the reaction mixture may be heated until beta zeolite exhibiting sufficiently high crystallinity is generated. In general, beta zeolite exhibiting satisfactory crystallinity is obtained by heating for about 5 hours or longer and 150 hours or shorter.

A crystal of beta zeolite is obtained by the heating described above. After the heating is completed, the crystal powder generated is separated from the mother liquor by filtration, then washed with water or warm water, and dried. It is preferable to remove TEA by a calcination treatment in order to sufficiently exert the properties of the beta zeolite crystal thus obtained. The calcination can be conducted by, for example, a method in which a heat treatment is conducted at a temperature of 500° C. or higher in the air. When beta zeolite is used as a solid acid catalyst, for example, the beta zeolite can be used as a $H^+$ type by exchanging a $Li^+$ ion in the crystal with an $NH4^+$ ion and then calcining the beta zeolite.

The beta zeolite of the present embodiment, which is thus obtained and contains zinc, is useful, for example, as an exhaust gas purifying catalyst for an internal combustion engine such as a gasoline engine or a diesel engine, a catalyst in the synthesis process (hydrocracking, catalytic dewaxing, isomerization dewaxing, isomerization, alkylation reaction, and the like) of petrochemical products, an adsorptive separator, an ion exchanger, and various kinds of functional materials.

EXAMPLES

Hereinafter, the present invention will be described in more detail with reference to Examples. However, the scope of the present invention is not limited to such Examples. Unless otherwise stated, "%" and "part" mean "% by mass" and "part by mass", respectively. The analytical instruments used in the following Examples, Comparative Examples, and Reference Examples are as follows.

Powder X-ray diffractometer: Powder X-ray diffractometer Ultima IV manufactured by Rigaku Corporation, Cuka ray used, voltage: 40 kV, electric current: 40 mA, scan step: 0.02°, and scan speed: 2°/min Composition analyzer: ICP-AES LIBERTY Series II manufactured by Varian, Inc.

Scanning electron microscope: Field emission type scanning electron microscope S-900 (manufactured by Hitachi High-Technologies Corporation)

BET surface area measuring apparatus: AUTOSORB-iQ2 manufactured by Quantachrome Instruments Example 1

(1) Synthesis of Seed Crystal

Beta zeolite having a $SiO_2/Al_2O_3$ ratio of 24.0 was synthesized using tetraethylammonium hydroxide as an organic SDA by conducting stirring and heating at 165° C. for 96 hours by a conventionally known method using sodium aluminate as an aluminum source and fine powdery silica (Cab-O-sil, M-5) as a silicon source. These were calcined at 550° C. for 10 hours while circulating the air in the electric furnace, thereby producing a crystal which did not contain an organic substance. These crystals were observed under a scanning electron microscope, and as a result, the average primary particle diameter $D_{50}$ was 30 nm ($SiO_2/Al_2O_3$ ratio=24.0). The X-ray diffraction pattern after the beta zeolite having a $SiO_2/Al_2O_3$ ratio=24.0 has been calcined is illustrated in FIG. 1. This crystal of beta zeolite, which did not contain an organic substance, was used as the seed crystal in the following Examples and Comparative Examples.

(2) Synthesis of Beta Zeolite

An aqueous solution was obtained by adding 1.515 g of a 35% aqueous solution of tetraethylammonium hydroxide and 0.101 g of lithium hydroxide to 0.367 g of pure water. A mixture of 0.946 g of one obtained by treating wet process silica (Mizukasil, P707) and zinc oxide at 600 rpm for 24 hours by using a planetary ball mill and 0.090 g of the seed crystal was added to the aqueous solution prepared above little by little and the mixture was stirred and mixed, thereby obtaining a gel having the composition presented in Table 1. Incidentally, the product treated by the ball mill was subjected to XRD measurement, and a peak attributed to ZnO was not observed.

Figure 2:
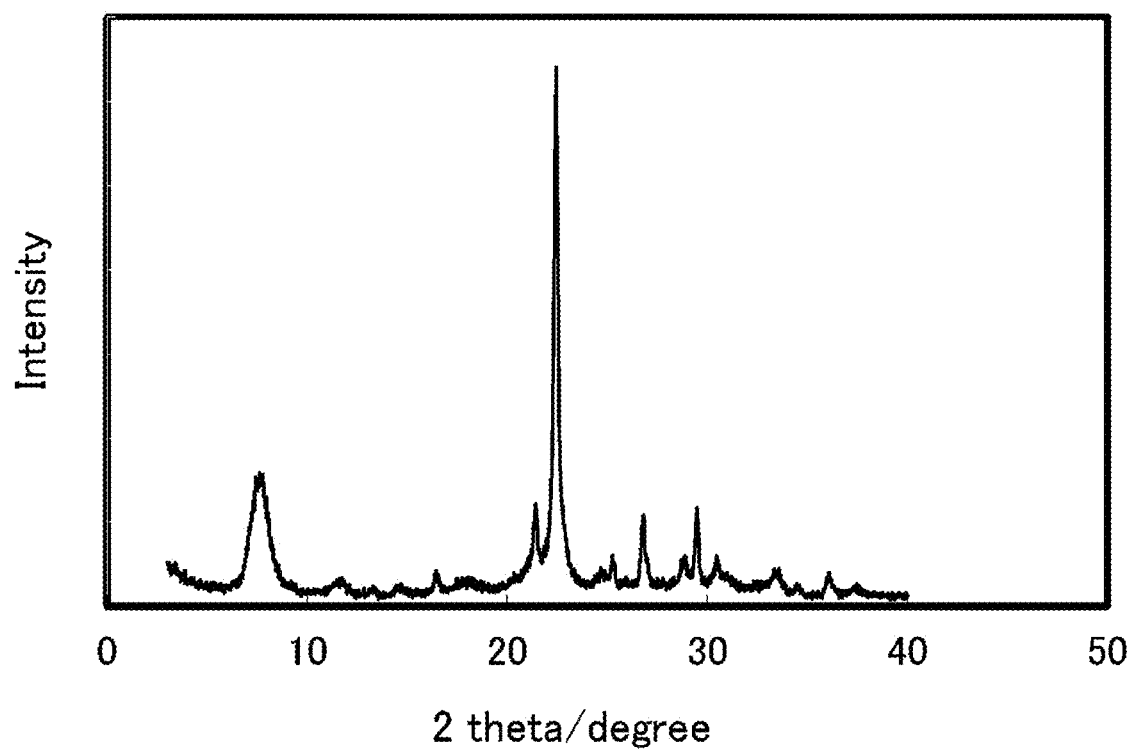
FIG. 2 is an X-ray diffraction pattern of beta zeolite obtained in Example 1.
Figure 3:
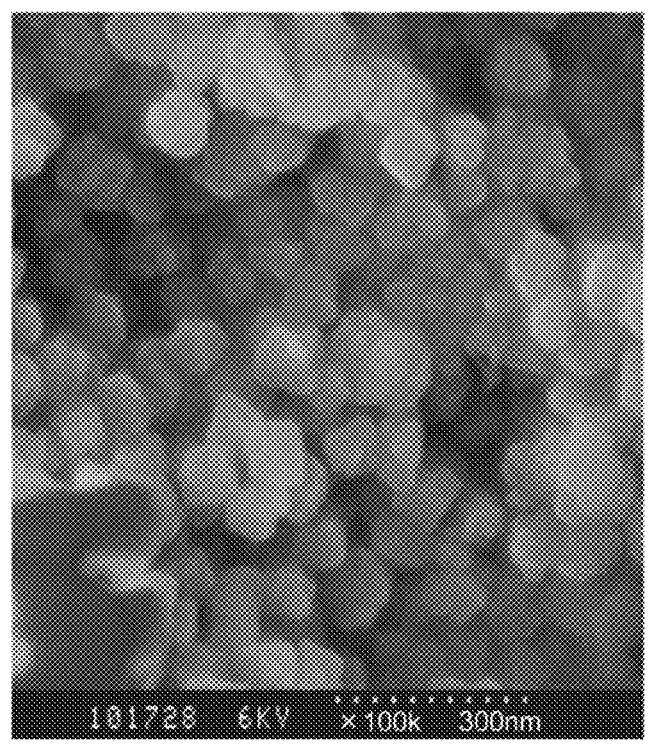
FIG. 3 is a scanning electron microscope image of beta zeolite obtained in Example 1.

The mixture of the gel and the seed crystal was placed in a 23 cc hermetically sealed vessel made of stainless steel and left to stand and heated at the autogenous pressure for 3 days at 150° C. without being aged and stirred. After the hermetically sealed vessel was cooled, the product was filtered and washed with water, thereby obtaining a white powder. As a result of XRD measurement of this product, it has been confirmed that this product is beta zeolite which does not contain impurities. The X-ray diffraction pattern of the beta zeolite thus obtained is illustrated in FIG. 2. In addition, the SEM image is illustrated in FIG. 3. The yield percentage of the beta zeolite thus obtained is presented in the following Table 1. The solid yield percentage of the product was determined by (mass of product after calcination)/(weight of raw material silica+mass of seed crystal)×100(%). The average particle diameter $D_{50}$ of the beta zeolite obtained in Example 1 was 75 nm at a cumulative frequency of 50% in the particle size distribution measured by SEM observation and $D_{90}/D_{50}$ was 1.3. In addition, the molar ratio of $SiO_2/ZnO$ of the beta zeolite obtained in Example 1 was 19.9 and the molar ratio of $SiO_2/Al_2O_3$ was 227.

Examples 2 to 11

Beta zeolite was obtained in the same manner as in Example 1 except that the conditions presented in Table 1 were adopted. The beta zeolite thus obtained was subjected to the same measurement as in Example 1. The results are presented in the following Table 1. In addition, the average particle diameter $D_{50}$ of the beta zeolite obtained in Examples 2 to 11 at a cumulative frequency of 50% in the particle size distribution measured by SEM observation and $D_{90}/D_{50}$ were about the same as the values in Example 1.

Comparative Example 1 and 2

In the present Comparative Example, a seed crystal was not used. In addition, the condition presented in Table 2 was adopted. The procedure was the same as in Example 1 except these. The product thus obtained was subjected to XRD measurement, and it was an amorphous substance.

Comparative Example 3

Figure 4:
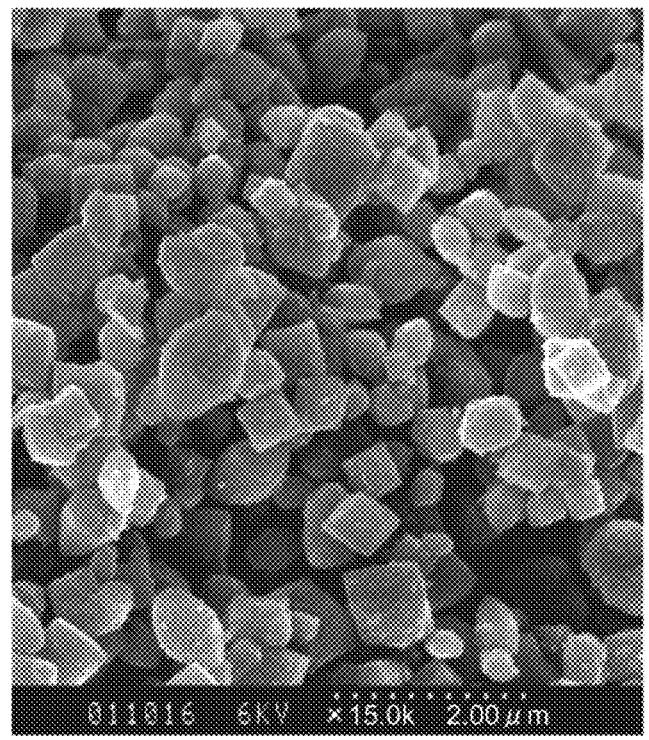
FIG. 4 is a scanning electron microscopic image of beta zeolite obtained in Comparative Example 3.

The present Comparative Example is an example in which beta zeolite was synthesized by the method described in Non-Patent Document 3. The beta zeolite thus obtained was subjected to the same measurement as in Example 1. The results are presented in the following Table 2. In addition, the SEM image of the beta zeolite thus obtained is illustrated in FIG. 4.

TABLE 1

| Example | Composition of reaction mixture $SiO_2/ZnO$ | $TEA_2O/SiO_2$ | $Li_2O/SiO_2$ | $H_2O/SiO_2$ | Mechano-chemical Time for treatment (h) | Seed crystal Amount added (wt %) | Heating condition Temperature (° C.) | Time (h) | Product Yield percentage (wt %) | Zeolite | $SiO_2/ZnO$ | $SiO_2/Al_2O_3$ | Surface area of micropores ($m^2/g$) | Volume of micropores ($cm^3/g$) |
|---|---|---|---|---|---|---|---|---|---|---|---|---|---|---|
| 1 | 5 | 0.17 | 0.08 | 5 | 24 | 10 | 150 | 72 | 74.9 | *BEA type zeolite | 19.9 | 227 | — | — |
| 2 | 10 | 0.17 | 0.08 | 5 | 24 | 10 | 150 | 72 | 81.6 | *BEA type zeolite | 24.0 | 153 | 475 | 0.19 |
| 3 | 25 | 0.12 | 0.08 | 5 | 24 | 10 | 150 | 72 | 73.0 | *BEA type zeolite | 32.3 | 141 | — | — |
| 4 | 25 | 0.13 | 0.12 | 20 | 24 | 10 | 150 | 72 | 72.5 | *BEA type zeolite | — | — | — | — |
| 5 | 25 | 0.16 | 0.04 | 20 | 24 | 10 | 150 | 72 | 70.9 | *BEA type zeolite | — | — | — | — |
| 6 | 25 | 0.17 | 0.08 | 5 | 24 | 10 | 150 | 72 | 72.4 | *BEA type zeolite | 54.4 | 140 | 540 | 0.21 |
| 7 | 25 | 0.17 | 0.08 | 20 | 24 | 10 | 150 | 72 | 71.7 | *BEA type zeolite | 68.4 | 197 | 484 | 0.19 |
| 8 | 25 | 0.21 | 0.04 | 20 | 24 | 10 | 150 | 72 | 66.6 | *BEA type zeolite | — | — | — | — |
| 9 | 25 | 0.21 | 0.04 | 20 | 0 | 10 | 150 | 72 | 64.4 | *BEA type zeolite + Amorphous substance (small amount) | — | — | — | — |
| 10 | 35 | 0.17 | 0.08 | 20 | 24 | 10 | 150 | 72 | 66.2 | *BEA type zeolite | — | — | — | — |
| 11 | 35 | 0.14 | 0.06 | 20 | 24 | 10 | 150 | 72 | 70.9 | *BEA type zeolite | 41.4 | 122 | 488 | 0.19 |

TABLE 2

| Comparative Example | Composition of reaction mixture | | | | Mechano-chemical Time for treatment (h) | Seed crystal Amount added (wt %) | Heating condition | | Product | | | |
|---|---|---|---|---|---|---|---|---|---|---|---|---|
| | $SiO_2/ZnO$ | $TEA_2O/SiO_2$ | $Li_2O/SiO_2$ | $H_2O/SiO_2$ | | | Temperature (° C.) | Time (h) | Yield percentage (wt %) | Zeolite | $D_{50}$ (nm) | $D_{90}/D_{50}$ |
| 1 | 25 | 0.17 | 0.08 | 20 | 24 | 0 | 150 | 72 | — | Amorphous | — | — |
| 2 | 25 | 0.21 | 0.04 | 20 | 24 | 0 | 150 | 72 | — | Amorphous | — | — |
| 3 | 33 | 0.33 | 0.03 | 30 | 0 | 0 | 150 | 96 | 55.2 | BEA type zeolite | 620 | 1.5 |

As presented in Table 1, according to the respective Examples, it has been found that fine beta zeolite composed of zinco silicate can be obtained at a high yield percentage. On the contrary, it has been found that only an amorphous substance is generated in the case of conducting the synthesis without using a seed crystal as in Comparative Examples 1 and 2. In addition, it has been found that beta zeolite is generated but the particle diameter thereof is large and the yield percentage thereof is low in the case of conducting the synthesis by a conventional method as in Comparative Example 3.

The invention claimed is:

1. A beta zeolite comprising silicon oxide, zinc oxide, and aluminum oxide, wherein
   a molar ratio of $SiO_2/Al_2O_3$ is 100 or more and 250 or less, and
   an average particle diameter of the beta zeolite is 50 nm or more and 100 nm or less at a cumulative frequency of 50% in particle size distribution measured by scanning electron microscope observation.

2. The beta zeolite according to claim 1, wherein a molar ratio of $SiO_2/ZnO$ is 15 or more and 80 or less.

3. A method for producing beta zeolite, the method comprising:
   (1) a step of mixing a silicon source, a zinc source, an M source, a lithium source, an alkali source, and water so as to obtain a reaction mixture having composition represented by a molar ratio to be presented below;
   $SiO_2/ZnO=2$ or more and 100 or less
   $SiO_2/M_2O_3=$more than 0 and 300 or less
   $Li_2O/SiO_2=0.01$ or more and 0.2 or less
   $TEA_2O/SiO_2=0.07$ or more and 0.25 or less
   $H_2O/SiO_2=3$ or more and 28 or less,
   in the formula, M represents at least one kind of element selected from the group consisting of aluminum, iron, boron, and gallium, TEA represents a tetraethylammonium ion,
   (2) a step of using beta zeolite as a seed crystal and adding the seed crystal to the reaction mixture at a proportion of 0.1% by mass or more and 30% by mass or less with respect to a silica component in the reaction mixture; and
   (3) a step of heating the reaction mixture to which the seed crystal has been added at 80° C. or higher and 200° C. or lower in a hermetically sealed manner.

4. The production method according to claim 3, wherein the reaction mixture which does not contain the seed crystal is heated at a temperature of 80° C. or higher and 200° C. or lower in a hermetically sealed manner, then the seed crystal is added to the reaction mixture, and the reaction mixture is further heated at a temperature of 80° C. or higher and 200° C. or lower in a hermetically sealed manner.

5. The production method according to claim 3, wherein the reaction mixture is stirred in the hermetical heating step.

6. The production method according to claim 3, wherein the beta zeolite used as the seed crystal is (i) one that contains silicon oxide and aluminum oxide but does not contain zinc oxide, (ii) one that contains silicon oxide and zinc oxide but does not contain aluminum oxide, and/or (iii) one that contains silicon oxide, aluminum oxide, and zinc oxide.

* * * * *